Nov. 27, 1956
F. M. CRONENWETT
2,771,854
DAIRY ORDER INDICATOR
Filed Dec. 13, 1955
2 Sheets-Sheet 1
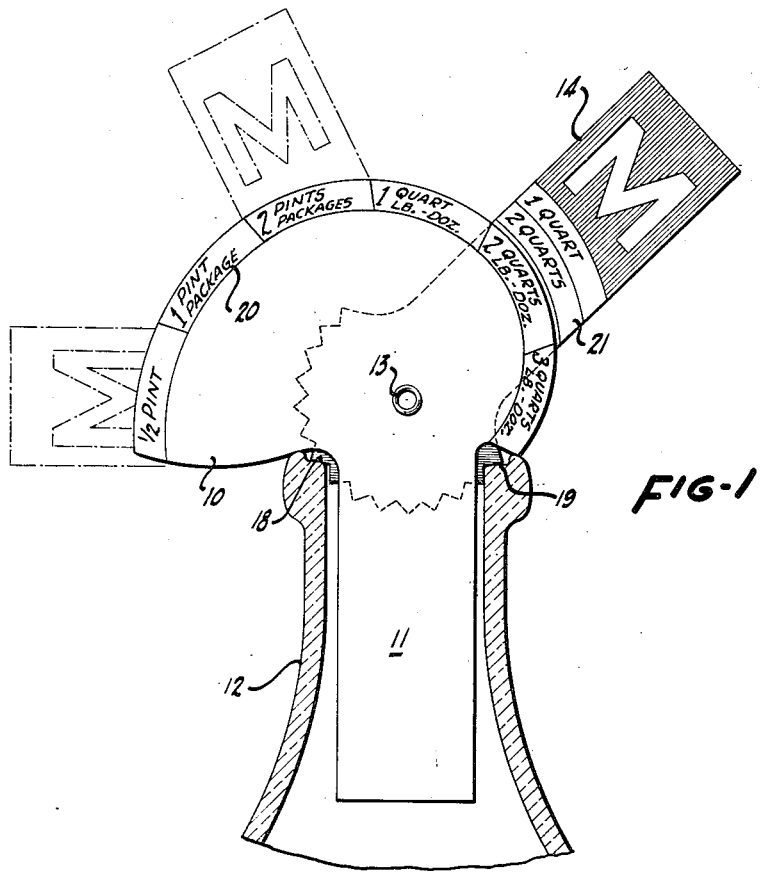
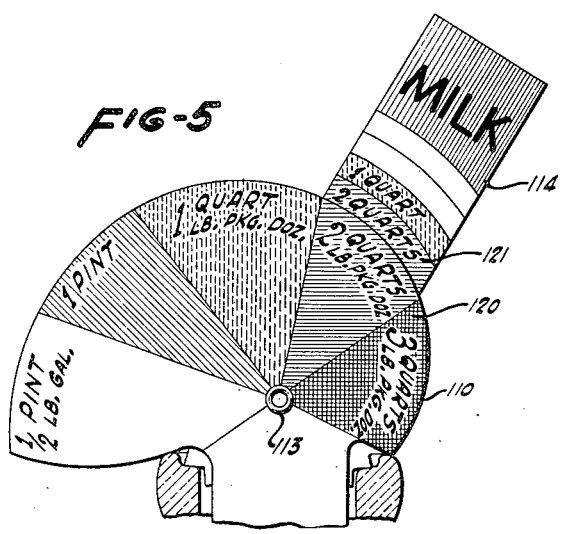
INVENTOR.
FRED M. CRONENWETT
BY *Naylor & Neal*
ATTORNEYS

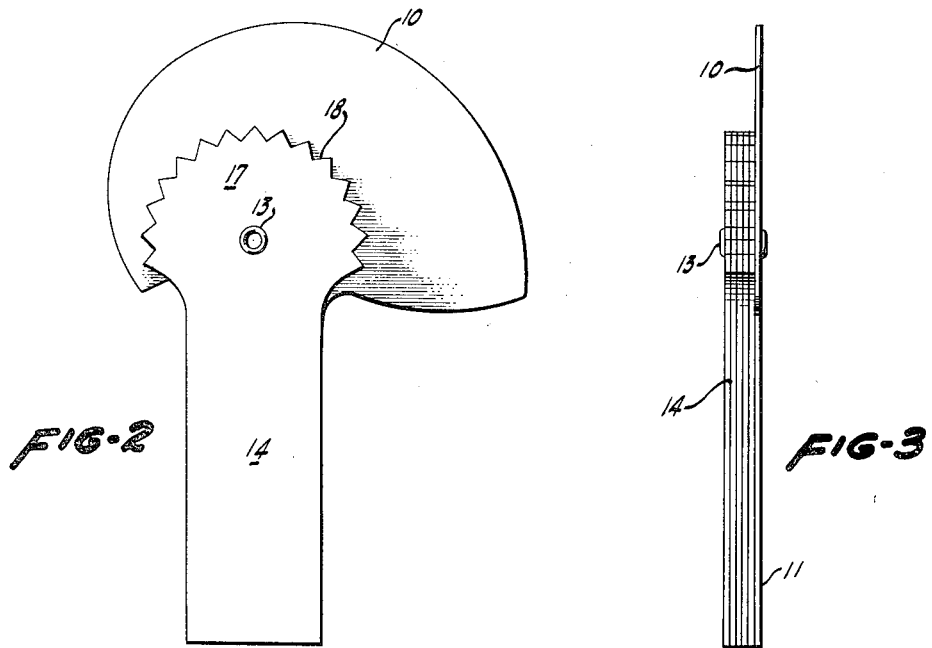
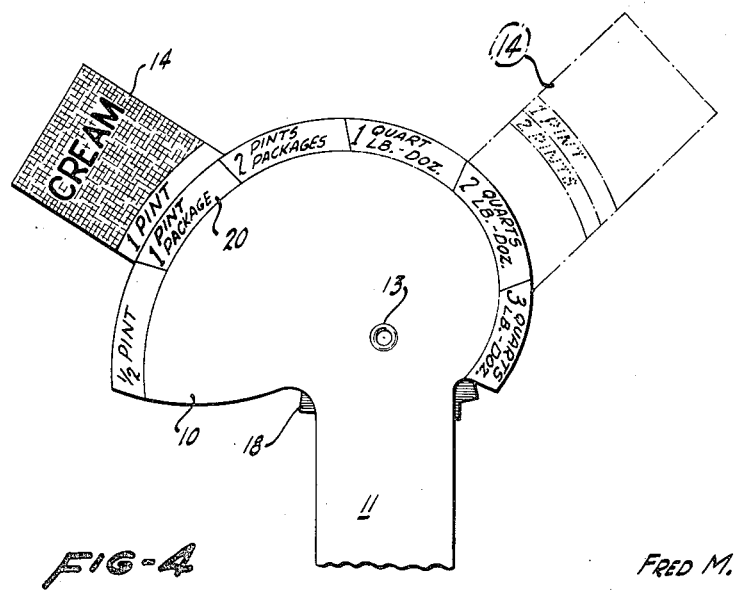

United States Patent Office 2,771,854
Patented Nov. 27, 1956

2,771,854

DAIRY ORDER INDICATOR

Fred M. Cronenwett, San Francisco, Calif., assignor to H. S. Crocker Company, Inc., San Francisco, Calif., a corporation of California Application December 13, 1955, Serial No. 552,816

3 Claims. (Cl. 116—133)

This invention relates to dairy order indicators of the type which are adapted to be inserted in and supported by an empty milk bottle, and is an improvement upon the subject matter of Letters Patent No. 2,245,964, granted to me on June 17, 1941.

In general, the subject matter of the instant application utilizes the basic component elements and principles of my previously patented device, wherein a series of order indicating flags are pivotally connected to a member having an enlarged head piece tapering into a shank insertable in the neck of a milk bottle. The flag pieces may be raised to selected order indicating positions or swung downwardly to coincide with the tapered shank of the aforesaid member having the headpiece and inserted in the neck of the milk bottle to an inoperative position. Furthermore, the inner ends of the flag pieces are enlarged and serrated to provide engagement with the sealing flange within the neck of the bottle to lock the same in their raised, order indicating positions.

In the use of the earlier form of my dairy order indicator, as with others, it has been found possible for the housewife to incorrectly communicate a desired order to the dairy deliveryman and, since the delivery of such products frequently takes place during the early hours of the day or when the customer may not be conveniently or quickly consulted concerning the intended order, the result is unsatisfactory from the standpoint of efficiency and dispatch in making home deliveries.

These problems have been solved through the development of the present invention wherein the use of structure and indicia is combined in such a fashion as to substantially insure against error in the communication of a desired order for mechandise.

Referring now to the accompanying drawings wherein a preferred embodiment of the invention is shown:

Figure 1 is a view in front elevation of my improved dairy order indicator in use and supported by a milk bottle;

Figure 2 is a view in rear view of my device with all flags in their down or inoperative position;

Figure 3 is a view in side elevation of the device in the same condition as shown in Figure 2;

Figure 4 is a view in front elevation of my device corresponding to Figure 1 to further illustrate the use of the same; and Figure 5 is a view in front elevation of a modification of the dairy order indicator.

I employ an eccentrically shaped head piece 10, tapering into a shank 11 insertable into the neck of the milk bottle 12, and having secured thereto, as by a rivet 13 or other form of fastener permitting pivotal action, a plurality of order indicating flags 14. The inner ends 17 of the flags 14 are enlarged and serrated, as at 18 (see Figure 2), to provide engagement with the stopper sealing flange 19 of the milk bottle 12 when the flags 14 are raised to their selected order indicating positions, as shown in Figure 1.

In the embodiment of Figures 1–4 the quantitative assortment of items carried by the deliveryman is disclosed by indicia carried adjacent the periphery of the eccentric head piece 10 and is generally designated by the numeral 20. Registering quantitative and species or kind indicia 21 is disposed on the respective flags 14.

Due to the eccentric shape of the head piece 10 the relative movement of the flags 14 will produce a permissive order indication or fail to establish such an order, according to whether the order indicia is put into proper registry or not. To illustrate, milk, indicated by the letter "M" on the red tab 14 in Figure 1, is delivered by the dairy companies in quarts, but is not available in pints or half-pints. Accordingly, the "Quart" indicia on tab 14 is so disposed as to be capable of being brought into registry to designate "1 quart" or "2 quarts," but movement of tab 14 of Figure 1 on its pivot and away from registering indicia, due to the eccentric shape of the head piece 10 and the location of the indicia on tab 14, will result in a non-registering position or positions wherein there will be a failure to communicate a permissible or proper order. As will be seen from Figure 1 movement of tab 14 from its true order indicating positions to non-ordering positions produces obscuration of the quantitative indicia on the tab 14 as the latter passes under the more extended areas of the head piece 10.

In Figure 4 there is illustrated a variant function of the device. Here the tab 14, bearing indicia denoting "1 pint" or "2 pints" of cream, is shown in one position as placing a proper or permissible order for one pint of such product, by virtue of the registry of corresponding indicia on tab 14 and head piece 10 and (in dotted lines) in a second position failing to communicate a proper order because the indicia carried respectively by the tab 14 and head piece 10 does not correspond and goes out of registry as the tab moves under the less extended areas of head piece 10.

The embodiment of Figure 5 differs from that of Figures 1–4 in that a flag, such as 114, is provided not only with quantitative and species indicia 121, but the flag sections bearing said indicia 121 are differently colored in respective matching relation with corresponding indicia bearing sections 120 of head piece 110, and in that the colored sections 120 are extended in wedge form to the rivet 113. The matchable colors on the flags and head piece, in addition to the elongated form of sections 120, further insure against the user making an error in setting the indicator for the order desired.

It will also be appreciated that the subject order indicator makes it possible for the full range of permissive orders to be covered with a considerably lesser number of flags than are required for conventional order indicators of the flag type. This is because one flag serves the purpose of ordering any one of a plurality of quantities of a species of dairy products, whereas the conventional indicators either have a separate species flag for each of the permissive quantities or selectively combinable species and quantity flags.

What is claimed is:

1. A dairy order indicator adapted to be supported adjacent a bottle mouth, a plurality of elongated flags, a carrier for said flags having a shank portion insertable within a bottle mouth and having an enlarged head portion provided with an eccentrically arcuate periphery, said flags having common ends thereof jointly pivotally attached to said head portion at the reverse side of said head portion, with the location of the point of pivotal attachment and the shape of said arcuate periphery being such that as any given flag is pivotally moved about said periphery in one direction a progressively greater amount of said flag is hidden by said head portion and such that as said flag is pivotally moved about said periphery in the other direction a progressively lesser amount of said flag is hidden by said head portion, quantitative measure indicia on the obverse side of said head portion selectively located around said periphery, quantitative measure indicia eccentrically arcuately displayed on the obverse sides of said flags in the intermediate areas thereof which are selectively hidable and disclosable with respect to said head portion, and product species indicia on the permanently disclosed outer ends of the obverse sides of said flags, said overall indicia arrangement being such that when the flag for a given product species is brought into radial registry with a given indicia on said head portion the existence of an order for said species in the quantity indicated by said head portion indicia is established only when the quantitative indicia on said flag corresponds with said given indicia on said head portion and is in margin to margin positional arrangement therewith.

2. The dairy order indicator of claim 1, with at least some of said flags being provided with a plurality of quantitative measure indicia, said indicia being displayed in parallel relation to each other and being disposed at different radial distances with respect to said point of pivotal attachment.

3. A dairy order indicator adapted to be supported adjacent a bottle mouth, a plurality of flags pivotally attached together and to a support member, said support member having an eccentrically arcuate periphery, successive portions of which, in one direction, are disposed progressively farther from the point of attachment of said flags to said support member, said support member bearing adjacent said periphery quantitative indicia with respect to which said flags may be selectively aligned, product species indicia carried by said flags at the free ends thereof, and quantitative indicia on said flags adapted to be matched with corresponding indicia on said support member by selective pivotal movement of said flags.

No references cited.